Nov. 11, 1924.  1,514,750

R. A. WINCHESTER
TRANSMISSION MECHANISM
Filed Feb. 26, 1924   3 Sheets-Sheet 1

Inventor
Raymond A. Winchester

By Herbert E. Smith
Attorney

Nov. 11, 1924.

R. A. WINCHESTER 1,514,750

TRANSMISSION MECHANISM

Filed Feb. 26, 1924

Inventor
Raymond A. Winchester

By Herbert E. Smith

Attorney

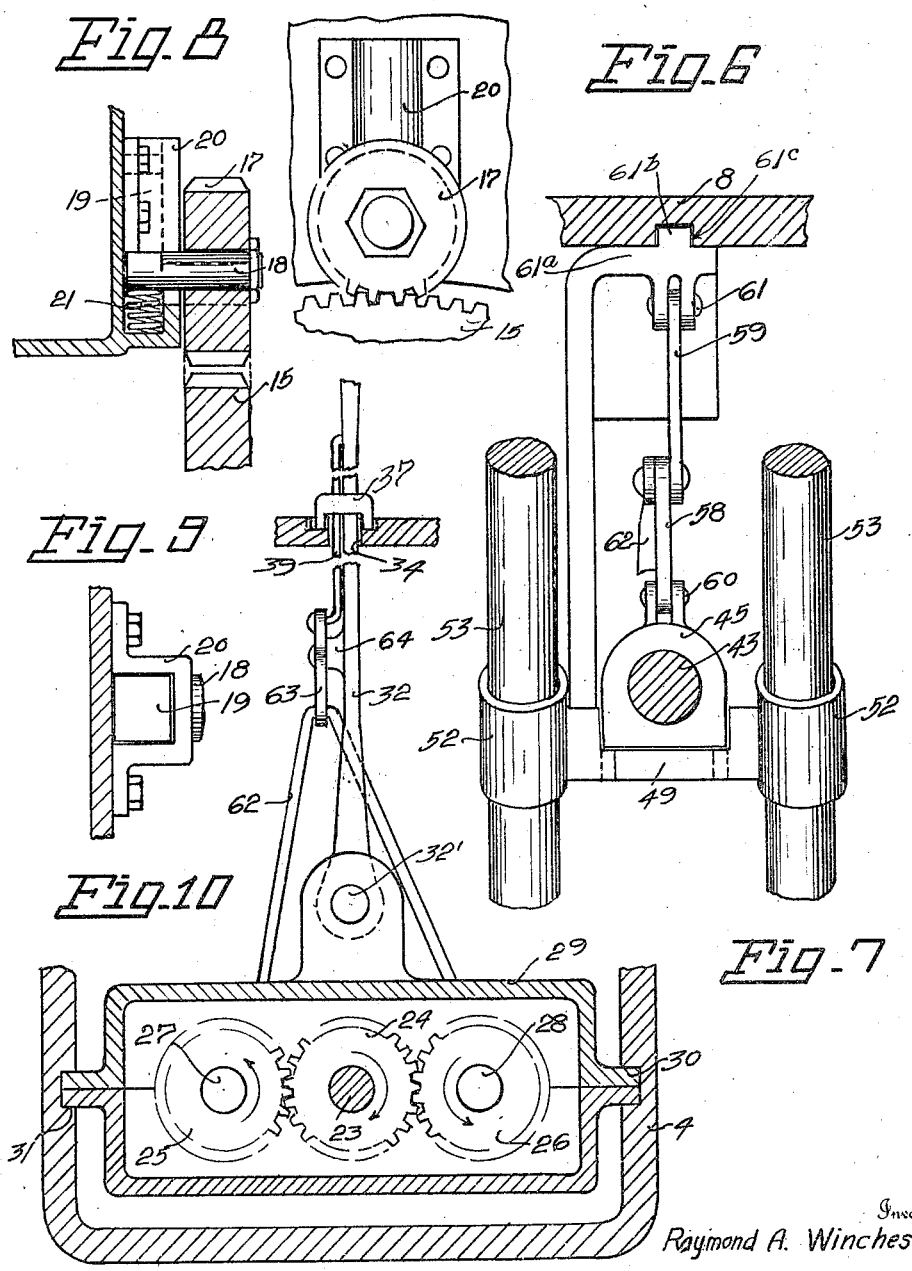

Patented Nov. 11, 1924.

1,514,750

UNITED STATES PATENT OFFICE.

RAYMOND A. WINCHESTER, OF LIND, WASHINGTON.

TRANSMISSION MECHANISM.

Application filed February 26, 1924. Serial No. 695,176.

*To all whom it may concern:*

Be it known that I, RAYMOND A. WINCHESTER, a citizen of the United States, residing at Lind, in Adams County and State of Washington, have invented certain new and useful Improvements in Transmission Mechanisms, of which the following is a specification.

My present invention relates to improvements in transmission mechanism for use in connection with motors or engines of automobiles and other automotive vehicles, as embodied in change-speed devices located between the engine or driving shaft and the axially alined propeller shaft for the vehicle.

The invention contemplates the utilization in connection with stepped, forward-driving gears and a reverse driving gear, of duplex, flexible connections actuated from the engine shaft for selectively engaging the members of the stepped gears in such manner as to equalize the application or transmission of power in the form of rotary motion, and counter balance the transmission mechanism. The invention consists in certain novel combinations and arrangements of parts as will hereinafter more fully be described and claimed.

In the accompanying drawings I have illustrated one complete example of the physical embodiment of my invention wherein the parts are combined and arranged in accordance with the best mode I have thus far devised for the application of the principles of my invention.

Figure 6 is an enlarged detail view of the flexible suspension or supporting means for the duplex transmission gears.

Figure 7 is a view in cross section through the slide gear-box and a section of the telescopic engine shaft, showing the driving gears, together with the shifting lever and connections.

Figure 8 is a view of one of the reversing pinions and its bearings.

Figure 9 is a sectional view showing the resilient support for one of the reverse pinions and the relation of the pinion to the reversing gear.

Figure 10 is a view looking at the outer end of a supporting member for one of the reverse pinions showing the housing in which the support slides.

Figure 1:
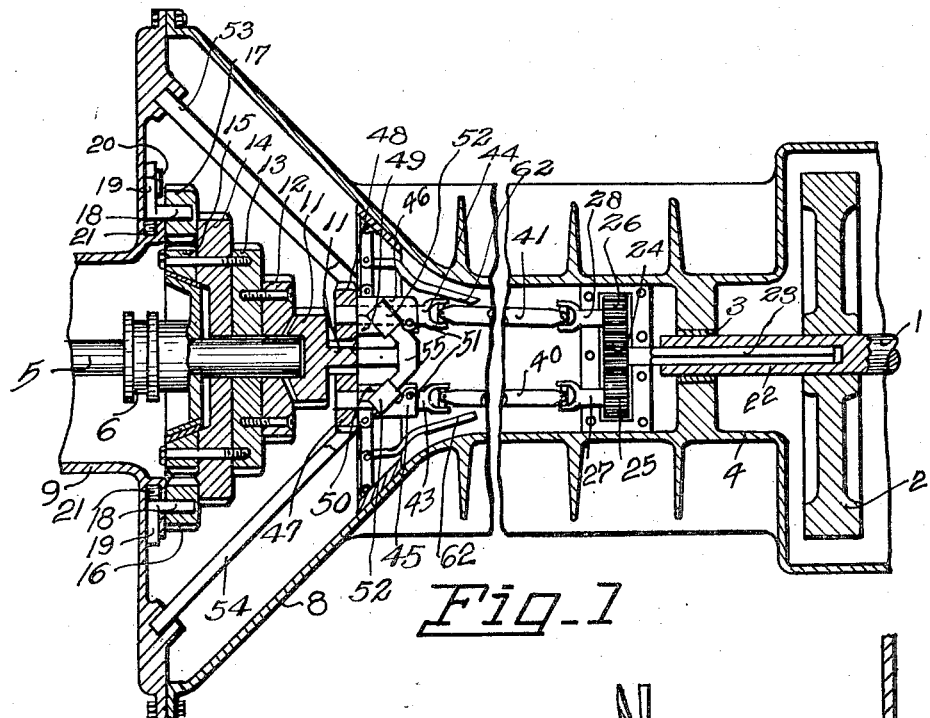
Figure 1 is a horizontal, longitudinal sectional view through the transmission casing and some of the operating parts of a mechanism embodying my invention.
Figure 2:
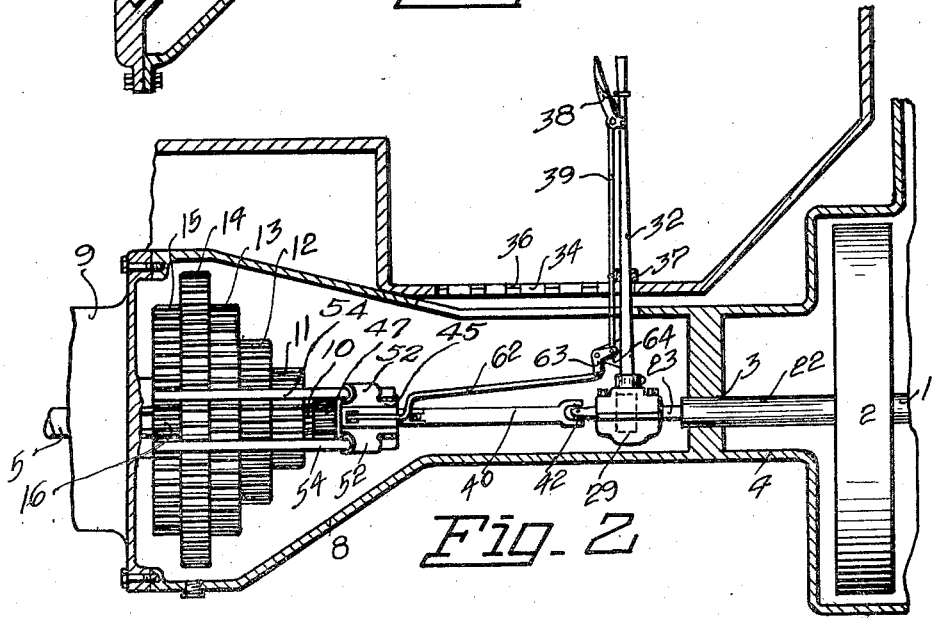
Figure 2 is a vertical, longitudinal sectional view through the casing, showing the operating parts in elevation.

In Figures 1 and 2 the engine shaft 1 may be of any well known and standard construction driven or revolved in usual manner and provided with the usual form of fly wheel 2.

One of the journal bearings for the engine shaft is illustrated at 3 in the casing 4, and the propeller shaft 5 which is axially alined with the engine shaft is provided with the usual connections for propulsion of a vehicle, a clutch 6 on the shaft being provided with a well known form of conical friction or clutch wheel, and supported within the enlarged, conical section 8 of the enclosing casing or tube 9.

The five forward driving gears hereinafter referred to as the driven gears, indicated as 10, 11, 12, 13, and 14, together with the reverse gear 15 are rigidly connected together but supported loosely on the propeller shaft 5, and the reverse pinion or gear has co-acting therewith a pair of intermediate gears 16 and 17. These intermediate reverse pinions are normally held out of engagement with the reverse gear, and are located at diametrically opposite points with relation to the reverse gear. The shafts 18 for the intermediate pinions are fashioned with angular slide blocks 19 rectangular in cross section, as seen in Figures 8, 9 and 10 and the slide blocks are slidable in housings 20 provided therefor which are disposed radially with relation to the reverse gear and affixed to a part of the gear casing. A spring 21 is interposed between the slide block and a part of the casing which tends normally to force the reverse or intermediate pinion away from and hold it out of engagement from the reverse gear 15.

The end of the crank shaft or engine shaft 1 is fashioned with a socket-head 22 in which a driving-shaft section 23 telescopes and is rotatable therewith, but slidable therein along its longitudinal axis, and the driving pinion 24 is carried by this slidable telescopic driving shaft section. The driving pinion is located between and co-acts with the duplex driving pinions 25 and 26 on the respective short, parallel shafts 27 and 28 which are journaled in the sectional, slidable gear box 29, which also has a journal bearing for the driving shaft section 23. The gear box with its three shafts and three driving pinions is bodily movable along the longitudinal axis of the engine shaft, and for this purpose if provided with lateral flanges 30 forming slide tongues movable in the guide grooves 31 in the opposite walls of the casing 4. From this description it will be apparent that the gear box and its contents, together with the slidable shaft section or stem 23, are relatively movable with relation to the engine shaft in an axial line, and at all times the driving pinions and their shafts revolve with the engine shaft when the engine is running.

Figure 4:
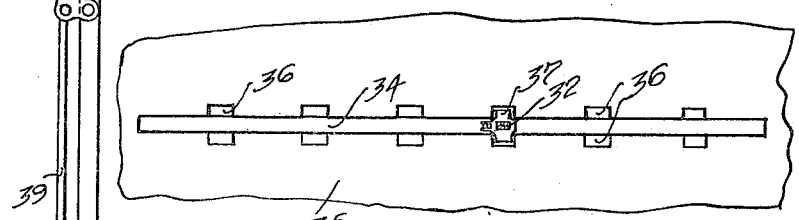
Figure 4 is a top plan view showing the slotted and notched plate with the shifting lever in section by means of which lever the two transmission gears are changed with relation to the stepped driven gears.
Figure 5:
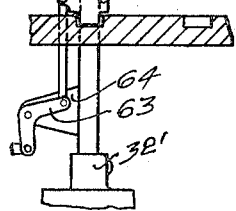
Figure 5 is a detail elevation view of the shifting lever and its connections.

The slidable elements are moved by means of the vertically arranged shaft lever 32 which is pivoted at 32' to the gear box 29 and projects upwardly through a guide slot 34 in a guide plate 35, for ready access by the driver of the vehicle. The slotted guide plate is fixed in suitable manner and the walls of the guide slot are fashioned with complementary notches 36, spaced in pairs at regular intervals as indicated in Figure 4, and adapted to receive the liftable locking detent 37 which is slidable on the shift lever 32 and pivoted to the spring pressed handle or hand grip 38 by means of the rod 39. Thus, before the shift rod 32 can be moved back or forward to shift or change the gears, the locking detent must first be withdrawn from the notched slot by pressure on the hand grip 38 to elevate the detent from engagement with the slotted and notched plate 35, then the shift rod may be moved as desired.

A duplex flexible connection is provided between the three driving pinions and the pair of transmission or change speed pinions to be described, which connection includes a pair of tumbler rods 40 and 41 having universal gimbal joints 42 with the stud shafts 27 and 28 of the driving gears, and similar joints with oppositely arranged stud shafts 43 and 44. Each of these duplex, sectional, flexible shafts revolves on its own axis and is operated from the three driving pinions 24, 25 and 26, and the two stud shafts 43 and 44 are journaled in the pair of bearing heads 45 and 46 which are movable on relatively diverging lines with respect to the axis of the propeller shaft.

The transmission or change speed pinions 47 and 48 are rigid with and revolvable with their respective shafts 43 and 44, and these pinions are adapted to selectively engage the stepped driven gears for forward or reverse propulsion of the automotive vehicle. The bearing heads are each carried by a cross head, as 49 and 50, and at 51 the bearing head is pivoted in the cross head in order that the bearing head and its journaled shaft, in each case, may swing outwardly from the longitudinal axis of the engine and propeller shafts. Thus the cross heads are capable of movement on diverging lines from the axis of the engine and propeller shafts, and in addition to this movement the bearing heads are capable of a pivoted movement with relation to the cross heads, the latter movement also being participated in by the stud shafts 43 and 44 and their pinions 47 and 48.

The relatively diverging movements of the cross heads are guided by means of a pair of laterally disposed slide sleeves 52 integral with the respective cross heads, and the sleeves of each pair being located at the sides of the head, as best seen in Figure 2 and Figure 7. Each pair of slide sleeves is carried and movable on a pair of guide rods or fixed braces 53 and 54, which radiate from a head 55 located at the longitudinal axes of the engine and propeller shafts, and the head 55 provides a bearing 56 in which the stud shaft 57 of the stepped or driven gears is journaled.

The bearing heads for the changeable transmission gears are supported on and movable relatively to the diverging pairs of guide bars 53 and 54 whose outer ends are anchored in the wall of the gear casing and these bars are arranged on lines parallel with the outer peripheries of the stepped gears. The bearing heads are also connected in order that they may be swung on their pivots to free the transmission pinions from the driven gear, and again brought into engagement with the driven gear for changing the speed of the propeller shaft. This changing movement of the transmission pinions is accomplished by means of pairs of pivoted links 58 connected at one end to the bearing head at 60 and link 59 pivoted to link 58 and also pivoted at 61 to slide plate 61$^a$ having a guide rib 61$^b$ movable in the interior groove 61$^c$ of the gear casing. The pivot joints of the two pairs of links 58 and 59 have pivoted thereon a V-shaped actuating yoke 62, which extends toward the engine or motor and at its bent end is pivoted to one arm of a bell crank lever 63, which in turn is pivoted on the bracket 64 carried by the shaft lever 32. The other end of this bell crank lever is pivoted at the lower end of the rod 39.

Figure 3:
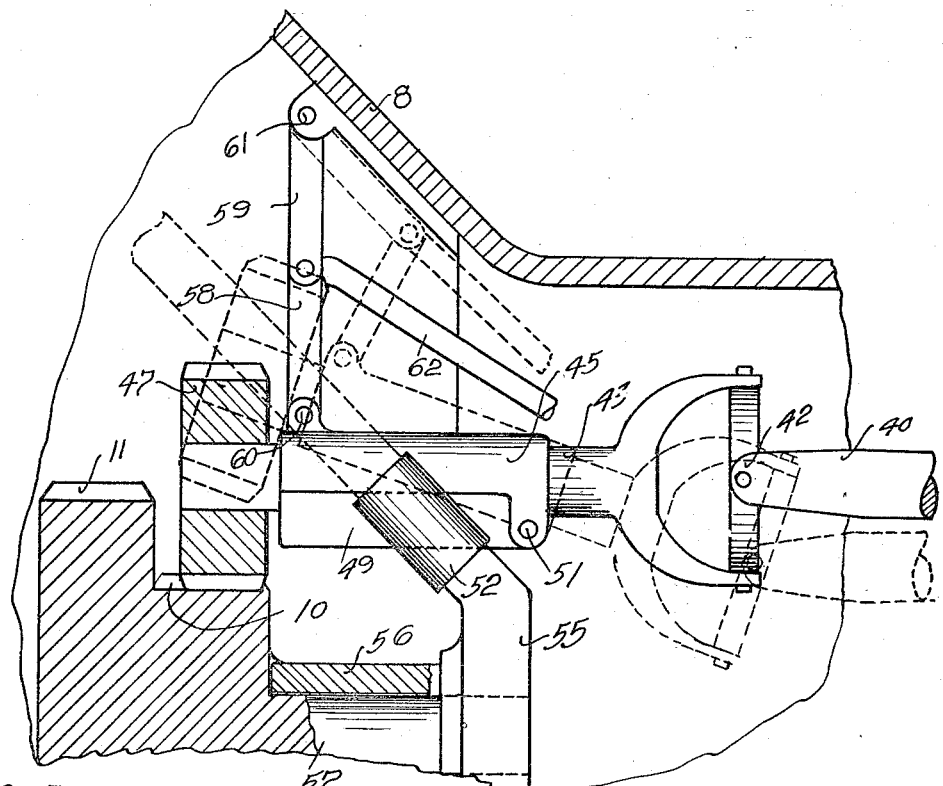
Figure 3 is an enlarged detail view partly in plan and partly in section showing the relation of one of the duplex, flexibly supported, transmission gears, to two of the stepped, driven gears of the machanism.

In Figures 1, 2 and 3 of the drawings the engine is driving the propeller shaft at highest speed, the power being transmitted from the driving gears 24, 25 and 26, through the duplex flexible shafts and change speed or transmission pinions 47 and 48 to the high speed gear 10 of the stepped gears. To decrease the speed of the propeller shaft to a selected degree, as for instance the third speed forward, the following simple operation is carried out. The hand grasping the lever 32 presses on the hand grip 38 to release the detent 37 from the notched and slotted plate 35 by lifting the rod 39. The same movement of the rod actuates the yoke 62 and the two pairs of actuating links 58—59, through the bell crank lever 63, and the two transmission pinions 47 and 48 are pulled outwardly in opposite directions and disengaged from the gear 10. The links 58 and 59 are flexed as indicated by dotted lines in Figure 3, and the bearing heads 45 and 46, together with stud shafts 43 and 44 are swung on the pivots 51 of the cross heads, as indicated in dotted lines in said figure. As the shift lever and the transmission pinions are released a push is applied to the shift lever, sliding the gear box 29 and its driving gears and the stem 23 to the left of Figure 1, and through the instrumentality of the pair of flexible shafts or tumbler rods the bearing heads and transmission pinions are caused to move to the left in Figure 1 and diverge. The sleeves 52 of the cross heads slide on the pairs of rods 53 and 54 until the pinions 47 and 48 reach a position abreast of the gear 12, whereupon the hand grip 38 is released and swings on its pivot to lower the rod 39 causing engagement of the detent with the selected notch. This movement of the rod also swings the bell crank lever which forces the yoke 62 to straighten the pairs of links 58 and 59 with the result that the bearing heads are brought into close contact with the cross heads and the transmission pinions are brought into engagement with the gear 12 at opposite sides thereof. The straight, alined links 58, 59 hold the bearing heads and their shafts in proper position to maintain the proper relationship between the change speed or transmission pinions and the gear 12, and the sleeves 52 support the cross heads of the bearing heads in rigid relation to the radius rods or pairs of diverging rods 53 and 54.

To reverse the movement of the propeller shaft, the same operation is performed with the shift lever and hand grip to bring the transmission gears into contact with the reverse pinions 16 and 17, and these pinions are forced, against the tension of the springs 21, in radial lines toward the reverse gear 15 with which they are engaged for driving the latter. When the transmission gears or pinions 47 and 48 are withdrawn as heretofore described from operative position the springs 31 force the reverse pinions out of engagement with the reverse gear.

While the two stud shafts 27 and 28 remain at all times parallel with the longitudinal axis of the propeller and engine shafts, it will be apparent that the flexible shafts comprising the sections 40—43 and 41—44 are bent or flexed, the universal joints 41 to the stud shafts 27 and 28 acting as pivotal points for the flexible shafts when they are swung to relatively diverging positions.

The location of the changeable transmission gears at diametrically opposite points of the stepped driven gear provide for an equal distribution of the applied power to the driven gears causing a uniform and balanced movement of the driven gears which results in smooth working of the gears and shafts.

The use of the gear box as a slidable support for the shift lever insures a stable and accurate movement of the lever, box and contained gears and shafts, and this movement may be accomplished with facility and convenience when manual power is applied to the upper end of the shift lever and hand grip which are located in position readily accessible by the driver of the vehicle.

While I have illustrated one exemplification of my invention it will be understood that changes and alterations may be made therein within the scope of my appended claims without departing from the spirit of my invention.

Having thus fully described my invention, what I claim as new and desire to secure by Letters Patent is—

1. The combination with stepped driven gears and a driving gear and its shaft, of a support diverging from the axis of the driven gears and a slidable bearing-head thereon and movable relatively thereto, a flexible shaft journaled in said bearing head and operatively connected to the driving-gear shaft, a change speed pinion on the flexible shaft, means for shifting the change-speed pinion and means connected therewith for engaging and disengaging the pinion and a selected driven gear.

2. The combination with stepped driven gears and a driving gear and driving shaft, of a support diverging from the axis of the driven gears and a slidable head thereon, a bearing head pivoted in the sliding head, a flexible shaft journaled in the bearing head and operatively connected to the driving shaft and a change-speed pinion on the flexible shaft, means for shifting the driving shaft, and means connected with the shifting means for engaging and disengaging the pinion and a selected driven gear.

3. The combination with stepped driven gears and a driving gear and its shaft, of a pair of rods diverging from the axis of the driven gears and a cross head having slide sleeves on said rods, a bearing head pivoted in the cross head, a flexible shaft connected with the driving shaft and journaled in said bearing head, means for shifting the driving shaft and means connected with the shifting means for engaging and disengaging the pinion and a selected driven gear.

4. The combination with stepped driven gears and supports adjacent thereto diverging from the longitudinal axis thereof, of a slide head on each diverging support and a bearing head pivoted in each slide head, a flexible shaft journaled in each bearing head and a change-speed pinion on each flexible shaft, a slidable gear-box, a driving gear and shaft operatively connected with each flexible shaft and journaled in said box and means for operating the driving gears, means for shifting the box, and means connected with the shifting means for engaging and disengaging the pinions and a selected driven gear.

5. The combination with stepped gears of a head supported to slide in a direction diverging from the axis of said gears, a flexible shaft, a bearing head for said shaft pivoted in the slide head, means for moving said shaft along a laterally shifting axis, a link pivoted to said bearing head and a second link pivoted to the first link and provided with a movable pivotal support, and means connected to said links and shaft-moving means for flexing said links.

6. The combination with stepped gears and guide rods diverging from the longitudinal axis thereof, of a pair of complementary flexible shafts having sliding supports on said rods and change speed pinions on the shafts, a slidable gear box and driving gears therein connected with said flexible shafts, means for sliding the gear box, and means connected with said sliding means for engaging and disengaging said pinions with a selected stepped gear.

In testimony whereof I affix my signature

RAYMOND A. WINCHESTER.